US009062583B1

(12) United States Patent  (10) Patent No.: US 9,062,583 B1
Harp et al.  (45) Date of Patent: Jun. 23, 2015

(54) SYSTEMS AND METHODS FOR THE USE OF VIRTUAL EMBLEMS

(75) Inventors: Derek R. Harp, San Mateo, CA (US); Bengt L. Gregory-Brown, Springfield, OH (US); Joseph P. Marfice, Pittsburgh, PA (US)

(73) Assignee: MASLOW SIX ENTERTAINMENT, INC., San Mateo, CA (US)

( * ) Notice: Subject to any disclaimer, the term of this patent is extended or adjusted under 35 U.S.C. 154(b) by 647 days.

(21) Appl. No.: 13/367,247

(22) Filed: Feb. 6, 2012

(51) Int. Cl.
G06F 3/0481 (2013.01)
F01N 3/20 (2006.01)

(52) U.S. Cl.
CPC .......................................... *F01N 3/20* (2013.01)

(58) Field of Classification Search
USPC ......................................................... 715/753
See application file for complete search history.

(56) References Cited

U.S. PATENT DOCUMENTS

| | | | | |
|---|---|---|---|---|
| 7,468,729 | B1 * | 12/2008 | Levinson | 345/473 |
| 7,716,140 | B1 * | 5/2010 | Nielsen et al. | 705/319 |
| 7,733,232 | B2 * | 6/2010 | Light et al. | 340/573.1 |
| 8,226,485 | B1 * | 7/2012 | Mooney et al. | 463/42 |
| 8,255,807 | B2 * | 8/2012 | Ganz et al. | 715/747 |
| 8,496,532 | B1 * | 7/2013 | Bethke et al. | 463/42 |
| 8,506,409 | B2 * | 8/2013 | Bethke et al. | 463/42 |
| 8,547,381 | B2 * | 10/2013 | Murphy | 345/474 |
| 8,574,076 | B2 * | 11/2013 | Mahajan et al. | 463/36 |
| 8,636,591 | B1 * | 1/2014 | Hawk et al. | 463/29 |
| 2002/0156866 | A1 * | 10/2002 | Schneider | 709/218 |
| 2004/0128621 | A1 * | 7/2004 | Orihara | 715/528 |
| 2006/0206827 | A1 * | 9/2006 | DeWitt | 715/762 |
| 2006/0235790 | A1 * | 10/2006 | Jung et al. | 705/39 |
| 2007/0136095 | A1 | 6/2007 | Weinstein | 705/2 |
| 2007/0220438 | A1 | 9/2007 | Okamoto et al. | 715/763 |
| 2007/0268299 | A1 * | 11/2007 | Jung et al. | 345/581 |
| 2008/0004116 | A1 | 1/2008 | Van Luchene et al. | 463/42 |
| 2008/0004118 | A1 | 1/2008 | Van Luchene et al. | 463/42 |
| 2008/0066020 | A1 | 3/2008 | Boss et al. | 715/968 |
| 2008/0270458 | A1 * | 10/2008 | Gvelesiani | 707/103 R |
| 2009/0040289 | A1 * | 2/2009 | Hetherington et al. | 348/14.12 |
| 2009/0106673 | A1 * | 4/2009 | Jung et al. | 715/757 |
| 2009/0157495 | A1 * | 6/2009 | Cahuzac et al. | 705/14 |
| 2009/0158170 | A1 * | 6/2009 | Narayanan et al. | 715/753 |
| 2009/0164926 | A1 * | 6/2009 | Boyle et al. | 715/764 |
| 2009/0254859 | A1 * | 10/2009 | Arrasvuori et al. | 715/810 |
| 2009/0259648 | A1 * | 10/2009 | Bokor et al. | 707/5 |
| 2009/0327054 | A1 * | 12/2009 | Yao et al. | 705/12 |
| 2010/0057715 | A1 * | 3/2010 | Bates et al. | 707/5 |
| 2010/0131864 | A1 * | 5/2010 | Bokor et al. | 715/757 |
| 2010/0138455 | A1 * | 6/2010 | Alewine et al. | 707/803 |
| 2010/0185640 | A1 * | 7/2010 | Dettinger et al. | 707/758 |

(Continued)

OTHER PUBLICATIONS

Blizzard Entertainment, World of Warcraft Manual, 2004, pp. 1-208.

(Continued)

*Primary Examiner* — Reza Nabi
(74) *Attorney, Agent, or Firm* — Pillsbury Winthop Shaw Pittman LLP

(57) ABSTRACT

A virtual space is provided to users. In views of the virtual space, avatars represent users, including a first avatar representing a first user, engaging in the virtual space. Individual avatars are visually associated with an emblem in views of the virtual space. Systems and methods to enable the use of emblems present an emblem visually associated with a second avatar in a view of the first avatar to indicate a relationship between the first user and the second user.

25 Claims, 5 Drawing Sheets

(56) References Cited

U.S. PATENT DOCUMENTS

| | | | |
|---|---|---|---|
| 2010/0262572 A1* | 10/2010 | Cheng et al. | 706/47 |
| 2010/0312661 A1* | 12/2010 | Jung et al. | 705/26.1 |
| 2011/0143834 A1* | 6/2011 | Guinn et al. | 463/25 |
| 2011/0212717 A1 | 9/2011 | Rhoads et al. | 455/420 |
| 2011/0244952 A1* | 10/2011 | Schueller et al. | 463/27 |
| 2011/0296324 A1* | 12/2011 | Goossens et al. | 715/763 |
| 2011/0310260 A1* | 12/2011 | Jordan et al. | 348/207.1 |
| 2012/0029987 A1* | 2/2012 | Kusumoto et al. | 705/14.16 |
| 2012/0034971 A1* | 2/2012 | Harp et al. | 463/23 |
| 2012/0079046 A1* | 3/2012 | Murphy | 709/206 |
| 2012/0131086 A1* | 5/2012 | Hoffman et al. | 709/202 |
| 2012/0221414 A1* | 8/2012 | Hetherington et al. | 705/14.58 |
| 2012/0225723 A1* | 9/2012 | Webster et al. | 463/42 |
| 2013/0005473 A1* | 1/2013 | Bethke et al. | 463/42 |
| 2013/0005474 A1* | 1/2013 | Bethke et al. | 463/42 |
| 2013/0005480 A1* | 1/2013 | Bethke et al. | 463/42 |
| 2013/0006736 A1* | 1/2013 | Bethke et al. | 705/14.12 |
| 2013/0029735 A1* | 1/2013 | Hormigo Cebolla et al. | 463/4 |
| 2013/0103760 A1* | 4/2013 | Golding et al. | 709/204 |
| 2013/0246929 A1* | 9/2013 | Hoffman et al. | 715/738 |
| 2014/0057725 A1* | 2/2014 | Mahajan et al. | 463/42 |

OTHER PUBLICATIONS

IQuickKillzl, "Black Ops, Perks Equipment, Weapons, Emblem Creator, and More", YouTube [online], uploaded on Sep. 11, 2010, [retrieved on Jan. 17, 2013], retrieved from the Internet URL:http://www.youtube.com/watch?v=ujP6WotnQm0, 08:49-11:39.

Nolo.com, Inc., "How Federal Trademark Registration Works", Inc. com, accessed on Dec. 13, 2013, accessed from Internet via http:inc.com/articles/1999/10/14646.html, pp. 1-5.

\* cited by examiner

SYSTEMS AND METHODS FOR THE USE OF VIRTUAL EMBLEMS

CROSS-REFERENCE TO RELATED APPLICATIONS

This application hereby incorporates by reference the contents of U.S. patent application Ser. No. 13/290,955, entitled Systems And Methods For The Design And Use Of Virtual Emblems, and filed Nov. 7, 2011.

FIELD

The disclosure relates to systems and methods for the use of virtual emblems for users, avatars, and/or entities in a virtual space such that the emblems represent relationships between the users, avatars, and/or entities.

BACKGROUND

Virtual spaces that enable users to participate in games and/or other online (social) activities are known. In some of these virtual spaces, avatars representing the users are provided. Avatars that represent users may include visual characteristics such that users within the virtual space may recognize a user by his avatar. Users in virtual spaces are known to have different types of relationships with other users. In some virtual spaces, the existence of a relationship between a user and other users may be visible and/or knowable to some or all users within the virtual space.

In some virtual spaces, a user's avatar may include and/or be based on an image or picture provided by the user. In some virtual spaces, users can establish relationships, such as, e.g., friendships, with other users. In some virtual spaces, when a first user is interacting with a second user, one or both of these users may be able to obtain information regarding the other user's friendships. For example, the first user may be able to see a list of names and/or avatars of users that have established a relationship with the second user.

SUMMARY

One aspect of the disclosure relates to systems and methods for providing a virtual space to users. In views of the virtual space, avatars may represent users as a game is being played and/or other activities are performed (collectively referred to herein as activities) by and/or among the users in the virtual space. One aspect of the disclosure relates to system and methods for using emblems in the virtual space, such that an emblem may be associated with one or more avatars and/or users within the virtual space.

In some implementations, the system may include a server and client computing platforms that operate in a server/client configuration. View information of the virtual space may be transmitted and/or presented to the users on the client computing platforms. The client computing platforms may facilitate presentations of view of the virtual space. The users may be able to interact with the virtual space and/or participate in the activities through inputs to the client computing platforms. The server may be configured to execute one or more of a virtual space module, a relationship module, an emblem presentation module, an interface module, a registry module, and/or other modules.

The virtual space module may be configured to determine view information for transmissions to client computing platforms associated with users that facilitate presentation of views of a virtual space to the users on the client computing platforms. Some or all of the virtual space may be common among multiple users. The individual users may be represented in the virtual space by one or more avatars in views of the virtual space. Individual ones of the users or avatars (and/ or other representations of a user in the virtual space) may be visually associated with one or more emblems. These emblems may be distinct, i.e. visually distinguishable from other emblems. Emblems may include a combination of graphics, text, animations, video, and/or other design components that together serve the function, within the virtual space, of making the associated avatar and/or user distinguishable and/or recognizable to other users in the virtual space. The users may comprise a first user represented by a first avatar, a second user represented by a second avatar, and/or other users. An avatar may be visually associated with a primary emblem, such that the primary emblem appears with the avatar in views of the virtual space and represents the avatar. The first avatar may be associated with a first primary emblem, the second avatar may be associated with a second primary emblem, and so on.

Primary emblems may be associated with avatars on a per-user basis such that an emblem for an individual user may be associated with a plurality of different avatars that are controlled by the individual user within a single virtual space (e.g., a plurality of different characters linked to a user account). Primary emblems may be associated with avatars on a per-avatar basis. Primary emblems associated with avatars on a per-avatar basis may have one or more features common across a plurality of different avatars associated with an individual user. For example, a field color, a layout, an object, and/or other features may be maintained in common across a plurality of primary emblems associated with different ones of a plurality of different avatars of an individual user. The maintenance of the one or more features across the plurality of avatars may signify within the virtual space that the plurality of avatars all are linked to the same user.

Entities may comprise individual avatars and/or individual users within the virtual space, groups of avatars within the virtual space, a virtual organization within the virtual space, a non-player character within the virtual space, a user external to the virtual space (though possibly related in some other way to a user within the virtual space), places within the virtual space (e.g., a city, town, region, and/or other places) and/or other entities or combinations thereof. For example, a group of avatars that may be considered an entity for the purposes of this disclosure may act as a guild, clan, kinship, crew, team, platoon, and/or other group of users within the virtual space. Entities may be visually associated with an emblem (e.g., a primary emblem).

The virtual space module may be configured to present, render, and/or implement an emblem based on various considerations. The considerations may include characteristics of the client computing platform used to present the corresponding view information. For example, the number of available colors may be limited. In some implementations, one or more considerations may be based on a theme of the virtual space.

The relationship module may be configured to establish relationships between entities. Relationships may include one or more relationship types, and/or combinations of relationship types. By way of non-limiting example, in some implementations the relationship types may include friends and followers. In some implementations, relationship types may be organized in one or more hierarchies, and/or in one or more other superstructures.

The emblem presentation module may be configured to visually associate an avatar with one or more secondary emblems, the secondary emblems representing other entities, such that the one or more secondary emblems appear with the avatar in views of the virtual space. A secondary emblem that appears in views with a first avatar may be similar to or the substantially the same as the primary emblem representing a second avatar. Such a presentation of a secondary emblem may correspond to and/or signify a relationship between two entities. For example, the emblem presentation module may present multiple secondary emblems in views of a particular avatar, individual ones of which correspond to (and/or publicly signifying) a relationship between the user represented by the particular avatar and the entity represented by the secondary emblem. Note that the primary emblem of such a related entity is similar to or substantially the same, though perhaps smaller, as the presented secondary emblem.

The interface module may be configured to receive inputs from one or more users that affect presentation of one or more emblems, such as, e.g., one or more secondary emblems. The received inputs from a user may alter operations of the emblem presentation module. For example, a particular user may selectively hide and/or expose one or more secondary emblems corresponding to one or more relationships with entities in views of the virtual space. In some implementations, the interface module may be configured to generate an interface for presentation to individual users on the client computing platforms. The interface may present an offered set of user-selectable options for the presentation of emblems, such as, e.g., secondary emblems. The received inputs may include one or more selections from the offered set of user-selectable options. Alternatively, and/or simultaneously, the interface may provide other ways for users to affect the presentation of emblems, including, but not limited to, textual input, design descriptions, providing existing presentations and/or other graphics to reverse-engineer a pre-existing presentation of one or more emblems, mash-up a plurality of pre-existing implementations and/or graphics, and/or other ways for users to affect the presentation of one or more emblems.

A user account module may be configured to manage user accounts including account information of users. Individual user accounts may be associated with individual users in the virtual space. In some implementations, individual ones of the avatars may be based, at least in part, on account information of an individual user account.

A registry module may be configured to manage access to information included in one or more sets of emblems and/or designs of emblems. A set of emblems may correspond to users and/or entities active in (at least part of) the same virtual space.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
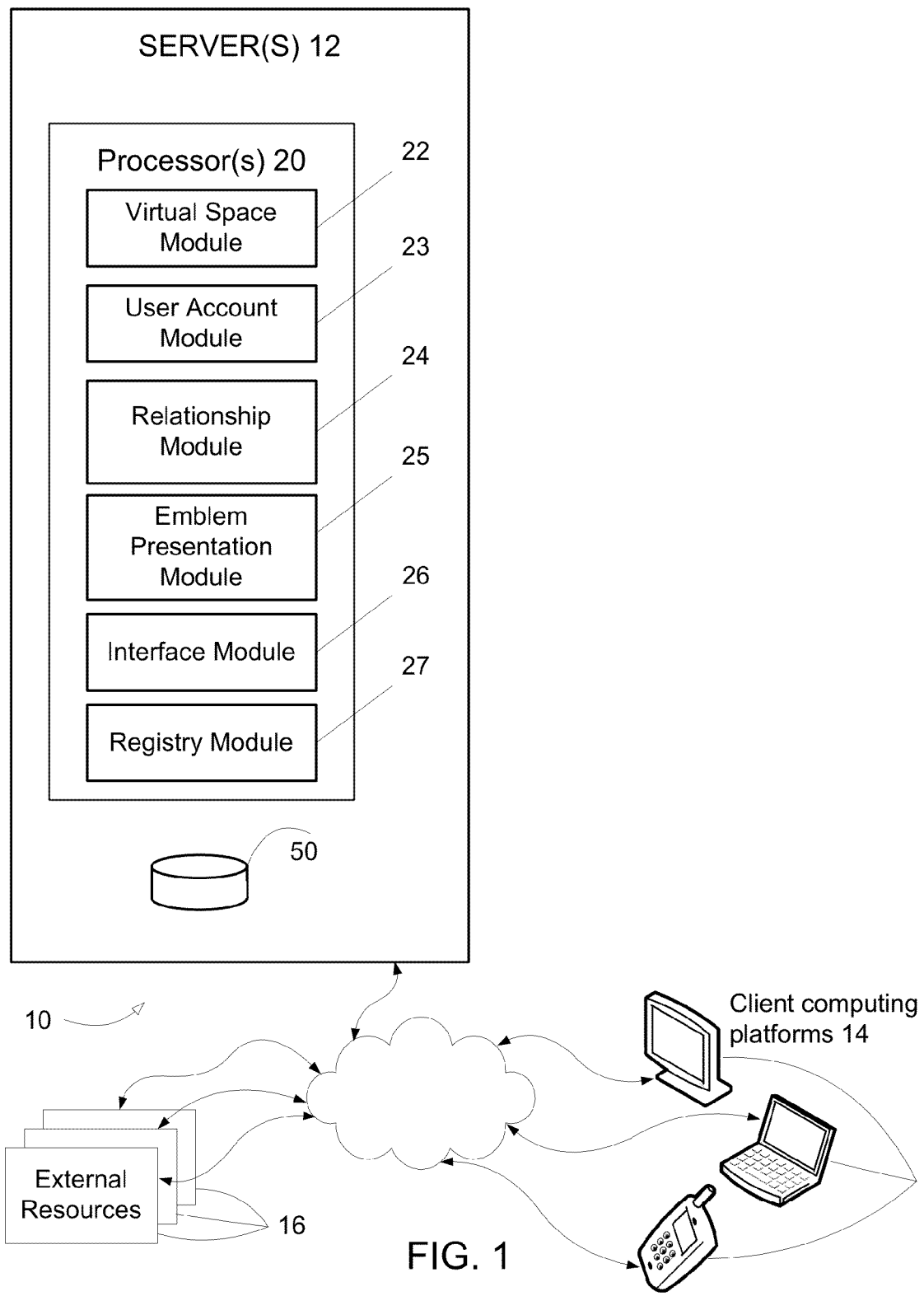
FIG. 1 schematically illustrates a system configured to enable the use of emblems for users in a virtual space.

FIG. 1 schematically illustrates a system 10 configured to enable the use and/or presentation of emblems for users in a virtual space. System 10 may be configured such that the users participate in a game within the virtual space. System 10 may be configured to determine view information for transmissions to one or more client computing platforms 14 associated with users engaging in the virtual space. System 10 may be configured to enable the use and/or presentation of emblems for users in views of the virtual space. Some or all of the virtual space may be common among multiple users. Providing the virtual space may include hosting the virtual space over a network.

In some implementations, system 10 may include one or more servers 12. Server 12 may be configured to communicate with one or more client computing platforms 14 according to a client/server architecture, and/or according to another suitable architecture. The users may access system 10 and/or the virtual space via client computing platforms 14.

In some implementations, system 10 may include one or more external resources 16. External resource 16 may include sources of information, hosts, and/or providers of external virtual spaces, external entities participating in the virtual space, and/or other resources.

One or more servers 12 of system 10 in FIG. 1 may be configured to execute one or more computer program modules, through one or more processors 20. The computer program modules may include one or more of a virtual space module 22, a user account module 23, a relationship module 24, an emblem presentation module 25, an interface module 26, a registry module 27, and/or other modules.

Virtual space module 22 of system 10 in FIG. 1 may be configured to provide one or more virtual spaces to users via client computing platforms 14. As used herein, a "virtual space" may include a virtual world and/or space, a virtual environment, one or more interactive, electronic social media, and/or other virtual communities, or a combination thereof. A virtual space may refer to a virtual space in which a game is being played that involves a plurality of users. Providing a virtual space to users may include executing one or more instances of a virtual space, determining view information representing the virtual space (e.g., from the one or more instances) for the users (e.g., individually and/or collectively), transmitting the view information to the client computing platforms 14 associated with the users to facilitate views of the virtual space being presented to the users, and/or other activities.

A virtual space may comprise a simulated space that is accessible by users via clients (e.g., client computing platforms 14) that present the views of the virtual space to a user. The simulated space may have a simulated physical layout, express ongoing real-time interaction by one or more users and/or non-player characters (NPCs), and/or be constrained by simulated physics that governs interactions between virtual objects in the simulated space. In some instances, the simulated physical layout may be a 2-dimensional layout. In some instances, the simulated physical layout may be a 3-dimensional.

Virtual space module 22 of system 10 in FIG. 1 may be configured to express the virtual space in a relatively limited manner. For example, views of the virtual space presented to the users may be selected from a limited set of graphics depicting an event in a given place within the virtual space. The views may include additional content (e.g., text, audio, animations, pre-stored video content, movable icons, avatars, and/or other content) that describes particulars of the current state of the space, beyond the relatively generic graphics. Icons representing game components (e.g., game pieces, weapons, animals, playing cards, dice, and/or other game components) may change and/or move within the views of the virtual space to depict a game being played within the virtual space. Such limited representation of the virtual space may reduce the cost of hosting the virtual space in terms of processing, storage, communication bandwidth, and/or other computing resource (e.g., on server 12 and/or client computing platforms 14). Other expressions of individual places within the virtual space are contemplated.

Within one or more instances of the virtual space executed by virtual space module 16, users may control avatars to interact with the virtual space and/or each other. As used herein, the term "avatar" may refer to an object (or group of objects), e.g. present in the virtual space, that represents an individual user. An individual user may be represented in the virtual space by one or more avatars in the views of the virtual space. For example, an avatar may be an anthropomorphic character, and/or another character. The avatar may be controlled by the represented user. While a game is being played within the virtual space, avatars may be positioned at different and/or various locations within the virtual space and/or views thereof. The avatar representing a given user may be created and/or customized by the given user. The user may have an "inventory" of virtual goods, abilities, and/or currency that the user can use (e.g., by manipulation of an avatar or other user controlled element, and/or other items) to interact with within the virtual space.

Users may participate in the virtual space by controlling one or more of the available user controlled elements in the virtual space (e.g., game elements, avatars, and/or other elements). Control may be exercised through control inputs and/or commands input by the users through client computing platforms 14.

An individual avatar may be visually associated with a primary emblem, such that the primary emblem appears with the avatar in views of the virtual space and represents the avatar. The first avatar may be associated with a first primary emblem, the second avatar may be associated with a second primary emblem, and so on. Emblems may include a combination of graphics, text, animations, video, and/or other design components that together serve various functions within the virtual space, including but not limited to making the associated avatar and/or user (possibly uniquely) recognizable to other users in the virtual space. The users may comprise a first user represented by a first avatar, a second user represented by a second avatar, and/or other users. An avatar may be visually associated with a primary emblem, such that the primary emblem is effectively visually associated with the user that is represented by the avatar. The first avatar may be associated with a primary emblem, the second avatar may be associated with a (different) primary emblem, and so on. Likewise, a user may be visually associated with a primary emblem, such that the primary emblem is in turn visually associated with the avatar that represents the user.

The first user may be associated with a primary emblem, the second user may be associated with a (different) primary emblem, and so on.

Entities may comprise individual avatars and/or individual users within the virtual space, groups of avatars within the virtual space, a virtual organization within the virtual space, a non-player character within the virtual space, a user external to the virtual space (though possibly related in some other way to a user within the virtual space), places within the virtual space (e.g., a city, town, region, and/or other places) and/or other entities or combinations thereof. For example, a group of avatars that may be considered an entity for the purposes of this disclosure may act as a guild, clan, kinship, crew, team, platoon, and/or other group of users within the virtual space. Entities may be visually associated with an emblem.

Virtual space module 22 of system 10 in FIG. 1 may be configured to present, render, and/or implement an emblem based on various considerations. The considerations may include characteristics of the client computing platform used to present the corresponding view information. For example, the number of available pixels and/or colors may be limited. In some implementations, one or more considerations may be based on a theme of the virtual space. Such considerations may limit, reduce, and/or prevent certain anachronisms.

In some implementations, the presentation of an emblem and/or the existence of a particular relationship may influence game play. For example, an NPC may take umbrage at the presentation of a particular emblem, or be extra helpful due to the presentation of a particular emblem and/or the existence of a particular relationship.

Virtual space module 22 of system 10 in FIG. 1 may be configured to manage one or more games being played by the users within the virtual space. Managing a game may include one or more of determining score, assessing status, success, and/or failure (e.g., of individual actions, sets, of actions, matches, game events within an individual match, and/or other episodes), determining random or pseudo-random game parameters, and/or other game management functions. Managing a game may include accepting input in the form of user selections and/or actions (e.g., input at client computing platforms 14), output from one or more random (or pseudo-random) number generators, rules and/or settings governing one or more game mechanics of the game, and/or other inputs. Managing a game may include determining outputs, e.g. in the form of scores (e.g., of individual actions, sets of actions, achievements, victories, missions accomplished, abilities obtained, treasures retrieved, matches played/won, game events within an individual match/mission, levels reached, content unlocked, and/or other scores), winners and/or losers, required actions to be performed by the users, and/or other outputs.

It will be appreciated that the description herein of virtual space module 22 providing a virtual space to a set of users in which a game may be played by the set of users is not intended to be limiting. For example, virtual space module 22 may be configured to provide a plurality of different virtual spaces to a plurality of different sets of users. The individual sets of users may be participating in different instances of the game within the individual virtual spaces, which may or may not be able to interact. The concepts described herein with respect to the individual virtual space and/or game extend to implementations in which a plurality of different virtual spaces are being used to conduct a plurality of different instances of the game (e.g., between different sets of users).

Relationship module 24 of system 10 in FIG. 1 may be configured to establish relationships between entities. Relationships may include one or more relationship types, and/or combinations of relationship types. By way of non-limiting example, in some implementations the relationship types may include friends and followers. In some implementations, relationship types may be organized in one or more hierarchies, and/or in one or more other superstructures.

In some implementations, relationship module 25 may be configured to establish individual ones of the relationships between users and/or other entities based on one or more relationship requests and one or more corresponding acceptances of the one or more relationship requests. For example, a first user represented by a first avatar may send, transmit, issue, and/or cause to issue a relationship request to a second user. The requested relationship may be confirmed, e.g., by the second user accepting the relationship request. Other protocols and/or ways to establish a relationship are contemplated. Relationships between more than two entities are contemplated.

In some implementations, depending on the relationship type, acceptance of a relationship request may imply, implicitly or explicitly, that, in this example, the first user is henceforth able to present, in views of the virtual space that include the first avatar, the emblem associated with the second user in a manner that (publicly) signifies the existence of the relationship and/or signifies the relationship type to other users and/or entities, i.e. as a secondary emblem for the first avatar. Alternatively, and/or simultaneously, the first user may be able and/or allowed to present an emblem representing himself in views of the virtual space, i.e. the primary emblem for the first avatar. Other users within the virtual space may be able to see and/or perceive the presentation of the secondary emblem in visual association with the first user and thus infer the existence of a relationship between the first user and the second user. In some implementations, individual ones of the relationships may be mutually revocable by any entity involved. In some implementations, revocation of a relationship may not be instantaneous, but, e.g., may affect the presentation of one or more emblems in a manner that is location-based and/or proximity-based. For example, the first user may need to interact with the second user to revoke the relationship.

In some implementations, based on visual distinguishable characteristics of the presentation of the secondary emblem, other users may infer information regarding the relationship type of the relation between the first user and the second user. One or more visually distinguishable characteristics of the presentation of the secondary emblem may pertain, e.g., to the spatial arrangement of the secondary emblem, for example in relation to the presentation of the primary emblem, if present, that is associated with the first avatar. For example, relatively more important relationships may be arranged above the primary emblem, whereas relatively less important relationships may be arranged below the primary emblem. Such conventions may be specific to a virtual space and/or determined by the designers, operators, and/or other stakeholders involved in operating the virtual space. A particular user may order, rank, sort, control, or otherwise determine one or more visual distinguishable characteristics of the presentation of one or more secondary emblems. In some implementations, a particular spatial arrangement of the secondary emblem, such as, e.g., in the row above or below the primary emblem, may indicate the type of relationship between the first user and the second user. For example, the row above the primary emblem may be designated for groups or virtual organizations the first user has a relationship with, such as, e.g., a guild or a temple. For example, the row below the primary emblem may be designated for users within the virtual space that follow, obey, are hired by, are controlled by, and/or owe allegiance to the first user.

Emblem presentation module 25 of system 10 in FIG. 1 may be configured to visually associate an avatar with one or more secondary emblems, the secondary emblems representing other entities, such that the one or more secondary emblems appear with the avatar in views of the virtual space. A secondary emblem that appears in views with a first avatar may be similar to or the substantially the same, though perhaps smaller, as the primary emblem representing a second avatar. Such a presentation of a secondary emblem may correspond to and/or (publicly) signify a relationship between two entities. For example, emblem presentation module 25 may present multiple secondary emblems in views of a particular avatar, individual ones of which correspond to (and/or publicly signifying) a relationship between the user represented by the particular avatar and the entity represented by the secondary emblem. Note that the primary emblem of such a related entity is similar to or substantially the same, though perhaps smaller, as the presented secondary emblem.

Figure 2:
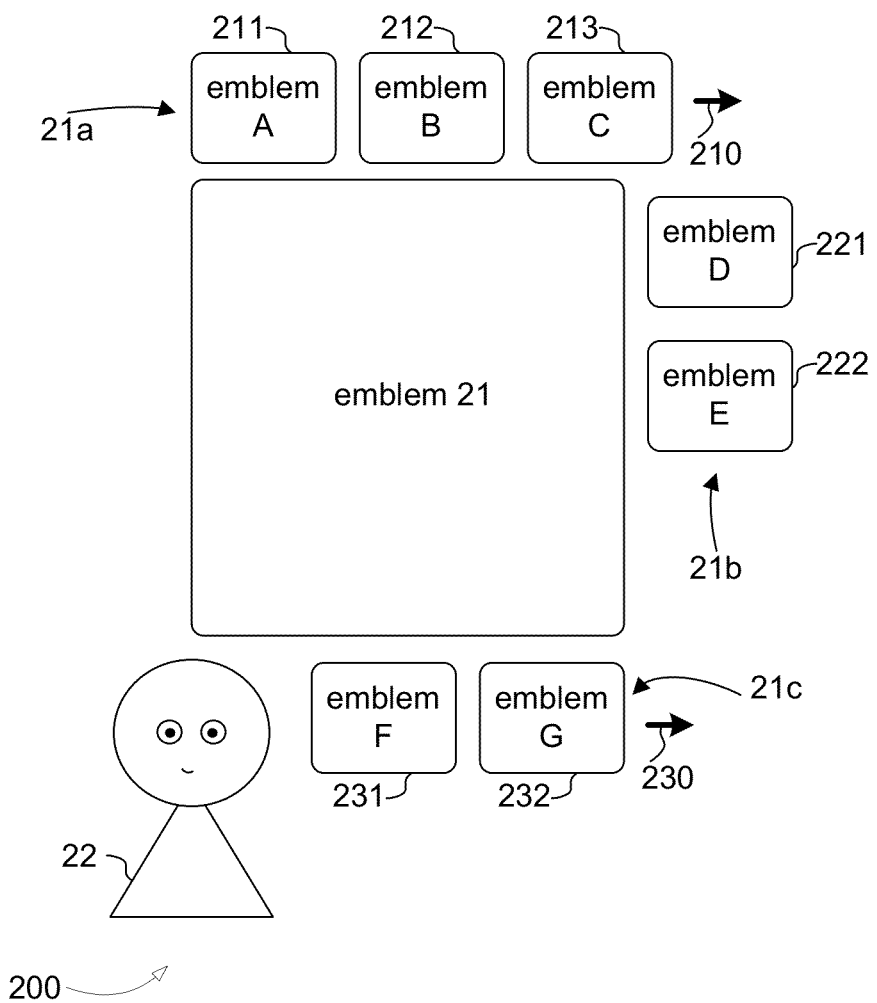
FIG. 2 illustrates a presentation of emblems for a particular user, in accordance with one or more implementations.

By way of illustration, FIG. 2 illustrates a presentation 200 of secondary emblems corresponding to relationships for a particular user, in accordance with one or more implementations. In the example depicted in FIG. 2, the particular user is represented by an avatar 22 in views of the virtual space. An emblem 21 in presentation 200 may be visually associated with avatar 22, as depicted in FIG. 2. Emblem 21 is the primary emblem associated with avatar 22. Secondary emblems 211, 212, 213, 221, 222, 231, and 232 are presented in visual association with emblem 21. Emblems 211, 212, and 213 have the visually distinguishable characteristic, compared to other presented secondary emblems in presentation 200, that they are arranged in a row 21a above emblem 21. In FIG. 2, presentation of a secondary emblem in row 21a may correspond to a particular type of relationship, for example an allegiance. An allegiance may indicate that the particular user owes some sort of fealty, service, membership, and/or type of allegiance to the entity represented by a secondary emblem in row 21a, such as, e.g., emblems 211, 212, and/or 213. In some implementations, only a limited, predetermined maximum number of secondary emblems may be presented simultaneously in row 21a. A continuation arrow 210 may indicate additional emblems exist that may fit a particular set of criteria for presentation in row 21a. Other indicators are contemplated. The particular user may be able to order, rank, and/or otherwise control which secondary emblems that fit the particular set of criteria are presented in row 21a. Other visually distinguishable characteristics are contemplated.

In FIG. 2, presentation of a secondary emblem in column 21b may correspond to a particular type of relationship, for example a friendship. A friendship may indicate that the particular user is friend with and/or a peer of the entity represented by a secondary emblem in column 21b, such as, e.g., emblems 221, and/or 222. In some implementations, only a limited, predetermined maximum number of secondary emblems may be presented simultaneously in column 21b. The particular user may be able to order, rank, and/or otherwise control how emblems that fit the particular set of criteria are presented in column 21b.

In FIG. 2, presentation of a secondary emblem in row 21c may correspond to a particular type of relationship, for example an apprenticeship. An apprenticeship may indicate that the entity represented by a secondary emblem in row 21c, such as, e.g., emblems 231, and/or 232 owes some sort of fealty, service, membership, and/or type of allegiance to the particular user of avatar 22. In some implementations, only a limited, predetermined maximum number of secondary emblems may be presented simultaneously in row 21c. A continuation arrow 230 may indicate additional emblems exist that may fit a particular set of criteria for presentation in row 21c. Other indicators are contemplated, including but not limiting to indicators pertaining to pagination, scrolling, and/or other indicators that additional emblems may be available for display and/or presentation. The particular user may be able to order, rank, and/or otherwise control which emblems that fit the particular set of criteria are presented in row 21c.

Presentation of secondary emblems may be based on considerations other than the type of relationship of the entities involved. For example, the presentation may be based on dynamic information such as proximity of avatar 22 to a particular entity or location within the virtual space, other positioning-related (dynamic) information, a particular status or condition of an entity within the virtual space, and/or other considerations. Visually distinguishable characteristics related to the presentation of secondary emblems may be implemented in ways other than pertaining to the spatial arrangement in relation to an avatar or the primary emblem associated with an avatar. For example, such a characteristic may be based on the use of colors, e.g. for a background color of a presented secondary emblem. A characteristic may be based on the size of a presented secondary emblem, such that, e.g., more important secondary emblems and/or corresponding relationships are presented bigger than less important secondary emblems and/or corresponding relationships. In some implementations, visually distinguishable characteristics may be based, at least in part, on a timing component. For example, older relationships may be distinguishable from newer relationships. For example, a more recently occurred interaction with a related entity may be distinguishable, through characteristics of the presentation of the associated secondary emblem, from interaction with another related entity that occurred longer ago. Other visually distinguishable characteristics are contemplated, both dynamic and static. Users may be able to affect and/or control the presentation of secondary emblems and/or the particular visually distinguishable characteristics used in a particular implementation. Other combinations of considerations (and/or criteria) with one or more visually distinguishable characteristics are contemplated, and may be non-permanent and/or user-configurable.

Referring to FIG. 2, it is contemplated that presentation 200 need not be static or two-dimensional. In some implementations, the position of one or more of secondary emblems 211-232 may change dynamically, to create the perception that the one or more secondary emblems are rotating, swirling, or otherwise moving in relation to primary emblem 21 and/or avatar 22. In some implementations, the position of emblems 211-232 may be arranged three-dimensionally rather than two-dimensionally. For example, emblem 21 may be a three-dimensional object within the virtual space. Emblems 211-232 may be arranged around more than one side of emblem 21, such that the presented view of emblems 211-232 may be based, at least in part, on the relative position of a viewer in relation to the position, angle, and/or orientation of avatar 22 and/or emblem 21.

Operational settings and/or options pertaining to emblem presentation module 25, including any considerations mentioned above may be specific to a virtual space and/or determined by the designers, operators, and/or other stakeholders involved in operating the virtual space. For example, in some implementations, a user may, e.g. by default, merely be able to select whether to hide all relationships or expose all relationships. It is contemplated that operational settings and/or options may be configurable and/or updateable before, during, and/or after deployment of system 10 and/or the virtual space. It is contemplated that increased control, such as fine-grained control of the presentation of secondary emblems, may be unlocked, awarded, purchased, and/or otherwise changed and/or obtained during game play.

Interface module 26 of system 10 in FIG. 1 may be configured to receive one or more inputs from an individual user that affect presentation, in views of the virtual space that include the avatar representing the individual user, of one or more secondary emblems. The received inputs may alter operations of emblem presentation module 25. For example, a user may selectively, e.g. through a user-selectable input, hide or expose one or more secondary emblems in views of the virtual space. In some implementations, interface module 26 may be configured to generate an interface for presentation to individual users on the client computing platforms. The interface may present an offered set of user-selectable options for the presentation of secondary emblems. The received inputs may include one or more selections from the offered set of user-selectable options. Alternatively, and/or simultaneously, an interface may provide other ways for users to affect the presentation of one or more secondary emblems, including, but not limited to, textual input, presentation descriptions, providing one or more existing presentations and/or other graphics to reverse-engineer a pre-existing presentation of one or more emblems, mash-up a plurality of pre-existing presentations and/or graphics, and/or other ways for users to affect the presentation of one or more emblems.

Figure 3:
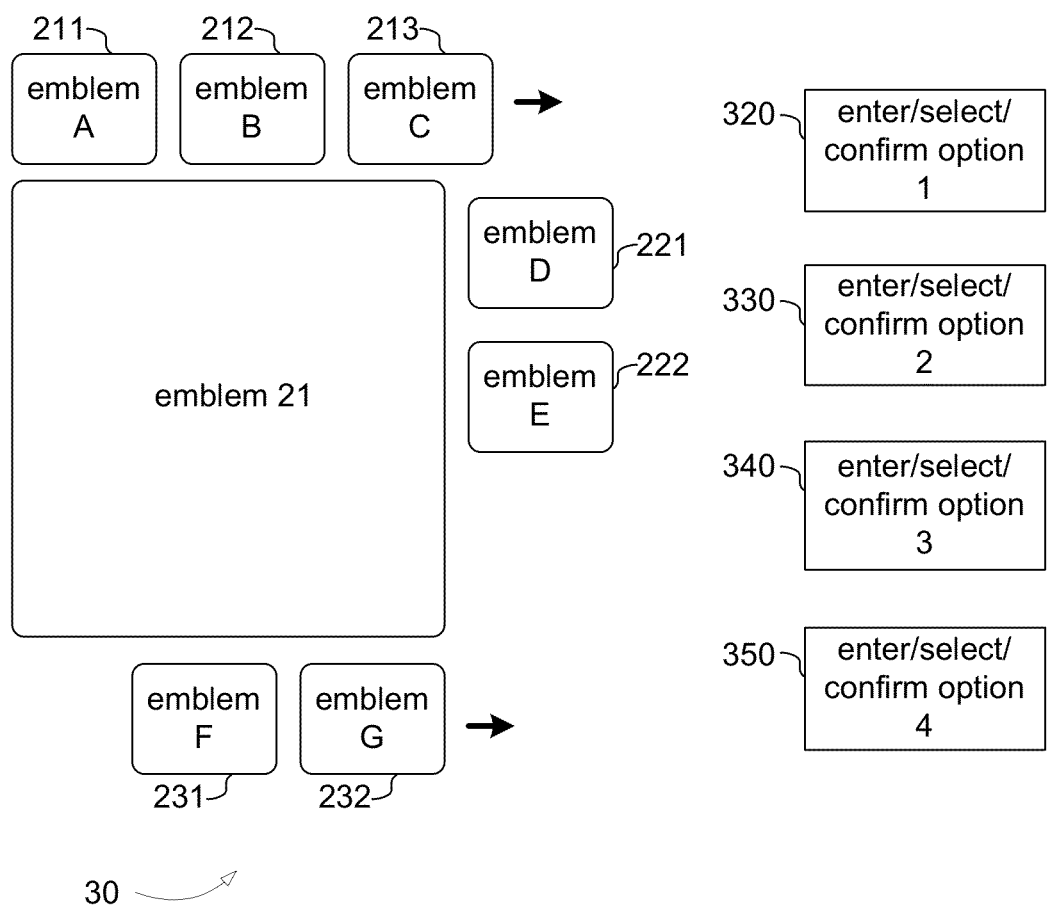
FIG. 3 illustrates a view of an interface used when affecting the presentation of emblems for a particular user, in accordance with one or more implementations.

By way of illustration, FIG. 3 illustrates a view of an interface 30, such as may be generated by interface module 26, to be used by a particular user when affecting the presentation of emblems corresponding to relationships of the particular user, in accordance with one or more implementations. If applicable, emblem 21 associated with an avatar representing a particular user himself may be depicted in interface 30. Interface 30 may present an offered set of user-selectable options for the presentation of one or more emblems corresponding to relationships of the particular user. The inputs received by interface module 26, e.g. through interface 30, may include one or more selections from an offered set of user-selectable options.

Interface 30 in FIG. 3 may include a preview of the current presentation of secondary emblems being affected, incorporating and/or representing the current set of selected user-selectable options that have been received from a user. Interface 30 may designate particular spatially arranged areas of a presentation, such as, e.g., the top row above emblem 21, the bottom row below emblem 21, and/or other designated areas. The designated areas in FIG. 3 are merely exemplary, and not intended to be limiting. Elements of interface 30 may be implemented as fields configured to receive entry, selection, and/or confirmation from a user. The fields may include one or more of a text entry field, a set of selectable menu items, a selectable field, and/or other fields configured to receive entry, selection, and/or confirmation from a user.

For example, interface 30 in FIG. 3 includes fields 320, 330, 340, 350 that may pertain to one or more user-selectable options for the presentation of emblems. The number of (user-selectable) fields depicted in FIG. 3 is meant to be exemplary, and not limiting in any way. For example, field 320 may be related to a selection of the way (such as, e.g., alphabetically, by status level, by interaction level, by manual selection, and/or by other ways) in which secondary emblems that fit a particular set of criteria are ordered, ranked, and/or otherwise controlled in a particular designated area, such as, e.g., the top row above emblem 21. Once a selection has been made and/or confirmed, the view of interface 30 may reflect the selected option.

Field 330 of interface 30 in FIG. 3, for example, may be related to a selection of one or more relationship types for secondary emblems to be presented in a particular designated area, such as, e.g., the right-hand side column next to emblem 21. Field 340, for example, may be related to a selection of one or more considerations to be used to filter secondary emblems, such as time-based considerations including, but not limited to, the emblems of most recently added and/or interacted with relationships and/or associated entities, location-based considerations, (dynamic) status-based considerations, and/or other considerations. Field 350, for example, may be related to a user-selectable option to hide or expose one or more secondary emblems, groups of emblems, relationships, relationship types, and/or other sets of emblems that fit a particular set of criteria.

In some implementations, the offered and/or available design options, such as, e.g., the options offered through fields 320, 330, 340, and 350 in FIG. 3, may be based on either game-wide considerations that may apply to all users in a particular virtual space, or user-specific considerations. For example, game-wide considerations may pertain to a theme of the virtual space, such as, e.g., pre-historic times, biblical times, medieval times, Victorian times, futuristic sci-fi times, and/or other themes. Such game-wide considerations may pose restrictions on the available color palettes, and/or other restrictions. User-specific considerations may pertain to account information and/or avatar-related information of a particular user. For example, a user may have selected a particular race, tribe, people, species, alliance, and/or group of available choices as part of the way the user represents himself within the virtual space. For example, sea-based creatures may select from a different set of options than land-based creatures. For example, elves may use a different color palette than trolls, and so forth. Note that any available options, game-wide and user-specific considerations and/or restrictions described herein may be configurable and/or updateable before, during, and/or after deployment of system 10 and/or the virtual space.

Note that the foregoing examples are merely intended to be exemplary, and not limiting in any way. The use, spatial arrangement, and described functionality of the user-selectable fields in interface 30 is likewise exemplary, and not limiting in any way. Any of the preceding functions described through particular user-selectable fields in interface 30 may be attributed to other elements of an interface.

User account module 23 of system 10 in FIG. 1 may be configured to manage user accounts including account information of users. Individual user accounts may be associated with individual users in the virtual space. Individual ones of the avatars may be based on account information of an individual user account. For example, the account information of a particular user may include information regarding a user-specific selection of a particular race, tribe, people, species, alliance, and/or group of available choices as part of the way the particular user represents himself within the virtual space. User-specific account information may affect the operation of other computer program modules. For example, one or more considerations used by emblem presentation module 25 may be based on a particular user's account information. For example, elves may use a different style and/or template of presentations than trolls, and so forth.

Registry module 27 of system 10 in FIG. 1 may be configured to manage access to information included in one or more sets of emblems. For example, a set of emblems may correspond to users of (at least part of) the same virtual space. Alternatively, and/or simultaneously, a set of emblems may correspond to users of (at least part of) multiple virtual spaces, which may be correlated in some way. For example, the multiple virtual spaces may be part of the same franchise of virtual video games, the same publisher, the same designer, a similar theme, and/or may be substantially unrelated. In some implementations, registry module 27 may manage (access to) a database of emblems for one or more virtual spaces.

Virtual space module 22 may be configured such that the presentation of one or more secondary emblems may be visually associated with the particular user and/or his avatar in views of the virtual space. Information regarding such an association may be shared with, accessible via, and/or stored by or through registry module 27. In some embodiments, a single user may be represented by multiple avatars. In some such cases, the presented secondary emblems for these avatars may be the same. In some such cases, presentations of secondary emblems for individual ones of these avatars may be controlled and/or affected per avatar.

Figure 4:
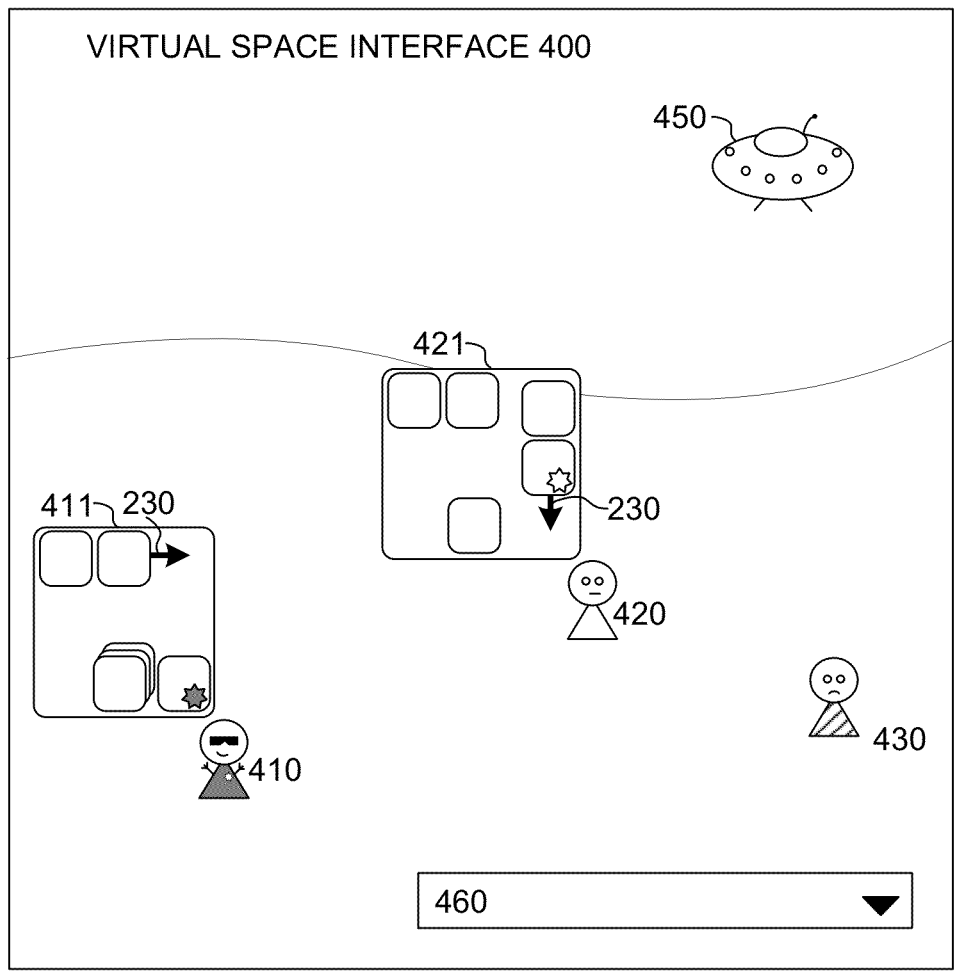
FIG. 4 illustrates a view of an exemplary virtual space interface in accordance with one or more implementations.

By way of illustration, FIG. 4 illustrates a view 40 of a virtual space interface 400 as presented to a particular user, e.g. a first user. View 40 may include a first avatar 410 representing the first user, a second avatar 420 representing a second user, a third avatar 430 representing a third user, game-wide interface element 450, user-specific interface element 460, and/or other components or features. These users may be engaging with the virtual space and/or interacting with one another substantially simultaneously. Game-wide interface element 450 may, e.g., be an object and/or a character that multiple users of the virtual world may interact with. User-specific interface element 460 may, e.g., be an object, interface, and/or other items that the first user viewing view 40 may interact with, such as a menu of user-selectable options and/or actions for engaging the virtual space. Virtual space interface 400 may be configured to present information to the user viewing view 40 of the virtual space.

Avatar 410 in FIG. 4 may be visually associated with presentation 411 of multiple secondary emblems, which may be visible to multiple users within the virtual space. Avatar 420 may be visually associated with presentation 421 of multiple secondary emblems, which may be visible to multiple users within the virtual space. Avatar 430 may not be associated (or not yet be associated) with a presentation of one or more secondary emblems, or the presentation associated with avatar 430 may not be visible (yet) within view 40, and/or to other users within the virtual space.

Presentation 411 of multiple secondary emblems in FIG. 4 depicts two emblems in a top row and four emblems in a bottom row. Continuation arrow 230 indicates that additional emblems fit the particular set of criteria used for the top row of presentation 411. The grouping of three emblems in the bottom row of presentation 411 may indicate that these emblems have a particular trait of characteristic in common. For example, these emblems may be associated with entities that below to the same virtual organization. The fourth emblem in the bottom row of presentation 411 is depicted with a visually distinguishable characteristic; a star. Such a depiction and/or characteristic may be related to any of the considerations described herein. For example, it may indicate a particular order or ranking in a hierarchy of relationships and/or types of relationships.

Presentation 421 of multiple secondary emblems in FIG. 4 depicts two emblems in a top row, two emblems in a right-hand side column, and one emblem in a bottom row. Continuation arrow 230 indicates that additional emblems fit the particular set of criteria used for the right-hand side column of presentation 421. One emblem in presentation 421 is depicted with a visually distinguishable characteristic; a star. Such a depiction and/or characteristic may be related to any of the considerations described herein. For example, it may indicate a particular order or ranking of location based information of one or more entities associated with the emblems available for presentation in association with avatar 420. For example, it may (dynamically) indicate a particular level of proximity of the particular entity associated with the emblem that is depicted with the star. In some implementations, a presentation of a secondary emblem may include static and/or dynamic status information pertaining to the particular entity associated with the presented emblem. Of course, provided examples in relation to the figures are merely exemplary, and in no way intended tom be limiting.

Turning back to FIG. 1, in some implementations, server(s) 12 and client computing platforms 14 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 12 and/or client computing platforms 14 may be operatively linked in other ways.

A given client computing platform 14 may include one or more processors, and electronic display, a control interface, and/or other components. The one or more processors may be configured to execute computer program modules. The computer program modules may be configured to enable or user associated with the given client computing platform 14 to interface with system 10, and/or provide other functionality attributed herein to client computing platforms 14. For example, the computer program modules may include a view module configured to receive view information from server 12 (e.g., generated by virtual space module 22), and to present a view of the virtual space (e.g., as described above) based on the received view information. This may facilitate participation by the user of the given client computing platform 14 in the game taking place in the virtual space. By way of non-limiting example, the given client computing platform 14 may include one or more of a desktop computer, a laptop computer, a handheld computer, a tablet computing platform, a NetBook, a Smartphone, a gaming console, a handheld gaming device, and/or other computing platforms.

The server 12 may include electronic storage 50, one or more processors 20, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented "in the cloud" by a plurality of computing platforms operating together as server 12.

Electronic storage 50 may comprise electronic storage media that electronically stores information. The electronic storage media of electronic storage 50 may include one or both of system storage that is provided integrally (i.e., substantially non-removable) with server 50 and/or removable storage that is removably connectable to server 50 via, for example, a port (e.g., a USB port, a firewire port, etc.) or a drive (e.g., a disk drive, etc.). Electronic storage 50 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 50 may include one or more virtual storage resources (e.g., cloud storage, a virtual private network, and/or other virtual storage resources). Electronic storage 50 may store software algorithms, information determined by one or more processors 20, information received from server 12, information received from client computing platforms 14, and/or other information that enables server 12 to function as described herein.

One or more processors 20 are configured to provide information processing capabilities in server 12. As such, one or more processors 20 may include one or more of a digital processor, an analog processor, a digital circuit designed to process information, an analog circuit designed to process information, a state machine, and/or other mechanisms for electronically processing information. Although processor 20 may be shown in FIG. 1 as a single entity, this is for illustrative purposes only. In some implementations, processor 20 may include a plurality of processing units. These processing units may be physically located within the same device, or processor 20 may represent processing functionality of a plurality of devices operating in coordination. Processor 20 may be configured to execute modules 22, 23, 24, 25, 26, and/or 27 by software; hardware; firmware; some combination of software, hardware, and/or firmware; and/or other mechanisms for configuring processing capabilities on one or more processors 20.

It should be appreciated that although modules 22, 23, 24, 25, 26, and/or 27 are illustrated in FIG. 1 as being co-located within a single processing unit, in implementations in which processor 20 includes multiple processing units, one or more of modules 22, 23, 24, 25, 26, and/or 27 may be located remotely from the other modules. As a non-limiting example, some or all of the functionality attributed to modules 22, 23, 24, 25, 26, and/or 27 may be provided "in the cloud" by a plurality of processors connected through a network. The description of the functionality provided by the different modules 22, 23, 24, 25, 26, and/or 27 herein is for illustrative purposes, and is not intended to be limiting, as any of modules 22, 23, 24, 25, 26, and/or 27 may provide more or less functionality than is described. For example, one or more of modules 22, 23, 24, 25, 26, and/or 27 may be eliminated, and some or all of its functionality may be provided by other ones of modules 22, 23, 24, 25, 26, and/or 27. As another example, processor 20 may be configured to execute one or more additional modules that may perform some or all of the functionality attributed below to one of modules 22, 23, 24, 25, 26, and/or 27.

Figure 5:
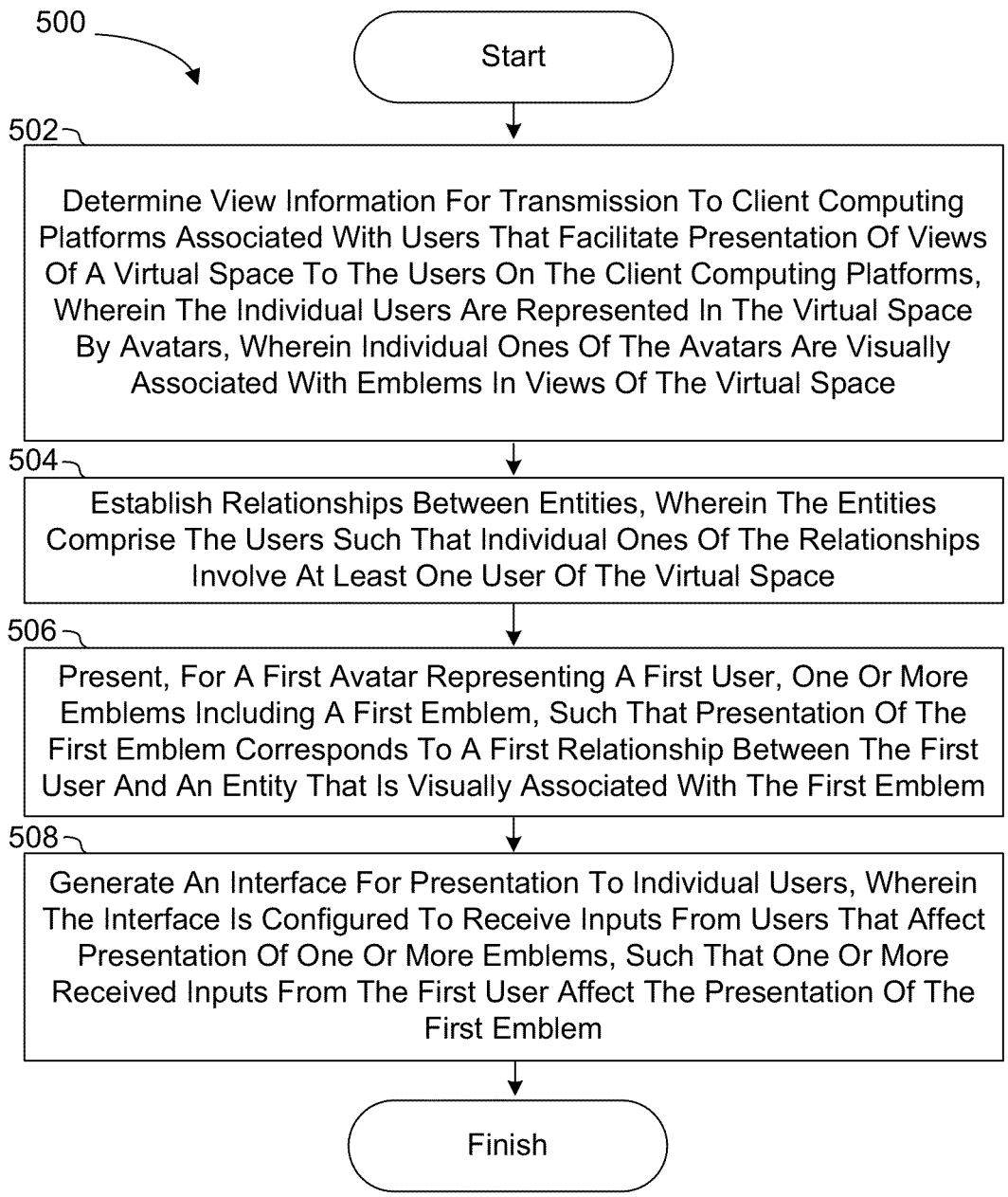
FIG. 5 illustrates a method of enabling the use and/or presentation of emblems for users in a virtual space.

FIG. 5 illustrates a method 500 for enabling the use and/or presentation of emblems by users in a virtual space. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, view information is determined for transmission to client computing platforms, associated with users, that facilitate presentations of views of a virtual space to the users on the client computing platforms. Users may be represented within the views of the virtual space by avatars. The virtual space may be common among users. Individual ones of the avatars may be visually associated with emblems. In some implementations, operation 502 may be performed by a virtual space module similar to or the same as virtual space module 22 (shown in FIG. 1 and described herein).

At an operation 504, relationships are established between entities within the virtual space. The entities comprise the users such that individual ones of the relationships involve at least one user of the virtual space. In some implementations, operation 504 may be performed by a relationship module similar to or the same as relationship module 24 (shown in FIG. 1 and described herein).

At an operation 506, one or more emblems including a first emblem are presented, for a first avatar representing a first user, such that presentation of the first emblem corresponds to (the existence of) a first relationship between the first user and an entity that is visually associated with the first emblem. In some implementations, operation 506 may be performed by a emblem presentation module similar to or the same as emblem presentation module 25 (shown in FIG. 1 and described herein).

At an operation 508, an interface is generated for presentation to individual users, wherein the interface is configured to receive inputs from users that affect presentation of the one or more emblems, such that one or more received inputs from the first user affect the presentation of the first emblem. In some implementations, operation 508 may be performed by an interface module similar to or the same as interface module 26 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to enable the use of emblems by users in a virtual space, the system comprising:
   one or more processors configured to execute computer program modules comprising:
   a virtual space module configured to determine view information for transmissions to client computing platforms associated with users that facilitate presentation of views of a virtual space to the users on the client computing platforms, wherein the individual users are represented in the virtual space by avatars, wherein the users include a first user represented by a first avatar and a second user represented by a second avatar, wherein individual ones of the avatars are visually associated with emblems in views of the virtual space such that the emblems are entirely spatially distinct from the avatars;
   a relationship module configured to establish relationships between entities, wherein the entities comprise the users such that individual ones of the relationships involve at least one user of the virtual space;
   an emblem presentation module configured to present, for the first avatar, emblems including a first emblem and a second emblem, such that presentation of the first emblem corresponds to a first relationship between the first user and a first entity, wherein the first emblem is visually associated with the first avatar, and such that presentation of the second emblem corresponds to a second relationship between the first user and a second entity, wherein the second emblem is visually associated with the first avatar, wherein the presentation of the first emblem includes status information pertaining to the first entity, wherein the first entity is the second user; and
   an interface module configured to receive inputs from users that affect presentation of one or more emblems, such that one or more received inputs from the first user affect the presentation of one or both of the first emblem and the second emblem and such that one or more received inputs from the second user affect the presentation of the first emblem.

2. The system of claim 1, wherein the relationship module is configured to establish individual ones of the relationships between entities based on one or more relationship requests and one or more acceptances.

3. The system of claim 1, wherein individual ones of the relationships are mutually revocable.

4. The system of claim 1, wherein individual ones of the relationships comprise one or more relationship types.

5. The system of claim 1, wherein one or more visually distinguishable characteristics of the presentation of the particular emblem corresponding to a particular relationship are based on a relationship type of the particular relationship.

6. The system of claim 1, wherein the entities comprise one or more of a group of users, a virtual organization within the virtual space, a non-player-character, or a related user external to the virtual space.

7. The system of claim 1, wherein the emblem presentation module, responsive to one or more inputs from the first user being received by the interface module, selectively hides or exposes the presentation of the first emblem.

8. The system of claim 1, wherein the emblem presentation module, responsive to one or more inputs from the first user being received by the interface module, affects the presentation of the first emblem based on a relationship type of the first relationship.

9. The system of claim 1, wherein operation of the emblem presentation module is based on a predetermined threshold of proximity between the location of the first avatar within the virtual space and the location of one or more entities within the virtual space.

10. The system of claim 1, wherein interaction within the virtual space between the first user and one or more entities during game play is affected based on which emblems are presented for the first avatar in views of the virtual space.

11. The system of claim 1, wherein individual ones of the emblems are visually distinct from a set of emblems by at least a predetermined number of design differences.

12. The system of claim 1, wherein the virtual space is common among the users.

13. A computer-implemented method for enabling the use of emblems by users in a virtual space, the method being implemented in a computer system comprising one or more processors configured to execute computer program modules, the method comprising:

determining view information for transmission to client computing platforms associated with users that facilitate presentation of views of a virtual space to the users on the client computing platforms, wherein the individual users are represented in the virtual space by avatars, wherein the users include a first user represented by a first avatar and a second user represented by a second avatar, wherein individual ones of the avatars are visually associated with emblems in views of the virtual space such that the emblems are entirely spatially distinct from the avatars;

establishing relationships between entities, wherein the entities comprise the users such that individual ones of the relationships involve at least one user of the virtual space;

presenting, for the first avatar, emblems including a first emblem and a second emblem, such that presentation of the first emblem corresponds to a first relationship between the first user and a first entity, wherein the first emblem is visually associated with the first avatar, and such that presentation of the second emblem corresponds to a second relationship between the first user and a second entity, wherein the second emblem is visually associated with the first avatar, wherein the presentation of the first emblem includes status information pertaining to the first entity, wherein the first entity is the second user; and generating an interface for presentation to individual users, wherein the interface is configured to receive inputs from users that affect presentation of one or more emblems, such that one or more received inputs from the first user affect the presentation of one or both of the first emblem and the second emblem and such that one or more received inputs from the second user affect the presentation of the first emblem.

14. The method of claim 13, wherein establishing individual ones of the relationships between entities is based on one or more relationship requests and one or more acceptances.

15. The method of claim 13, wherein individual ones of the relationships are mutually revocable.

16. The method of claim 13, wherein individual ones of the relationships comprise one or more relationship types.

17. The method of claim 13, wherein one or more visually distinguishable characteristics of the presentation of the particular emblem corresponding to a particular relationship are based on a relationship type of the particular relationship.

18. The method of claim 13, wherein the entities comprise one or more of a group of users, a virtual organization within the virtual space, a non-player-character, or a related user external to the virtual space.

19. The method of claim 13, wherein the presentation of the first emblem comprises selectively hiding or exposing the presentation of the first emblem based on one or more received inputs from the first user.

20. The method of claim 13, wherein the presentation of the first emblem is affected by one or more received inputs from the first user based on a relationship type of the first relationship.

21. The method of claim 13, wherein presentation of the first emblem is based on a predetermined threshold of proximity between the location of the first avatar within the virtual space and the location of one or more entities within the virtual space.

22. The method of claim 13, wherein interaction within the virtual space between the first user and one or more entities during game play is affected based on which emblems are presented for the first avatar in views of the virtual space.

23. The method of claim 13, wherein individual ones of the emblems are visually distinct from a set of emblems by at least a predetermined number of design differences.

24. The method of claim 13, wherein the virtual space is common among the users.

25. A non-transient computer-readable storage medium having stored thereon computer-readable instructions configured to caused one or more processors to execute a method for enabling the use of emblems by users in a virtual space, the method comprising:

determining view information for transmission to client computing platforms associated with users that facilitate presentation of views of a virtual space to the users on the client computing platforms, wherein the individual users are represented in the virtual space by avatars, wherein the users include a first user represented by a first avatar and a second user represented by a second avatar, wherein individual ones of the avatars are visually associated with emblems in views of the virtual space such that the emblems are entirely spatially distinct from the avatars;

establishing relationships between entities, wherein the entities comprise the users such that individual ones of the relationships involve at least one user of the virtual space;

presenting, for the first avatar, emblems including a first emblem and a second emblem, such that presentation of the first emblem corresponds to a first relationship between the first user and a first entity, wherein the first emblem is visually associated with the first avatar, and such that presentation of the second emblem corresponds to a second relationship between the first user and a second entity, wherein the second emblem is visually associated with the first avatar, wherein the presentation of the first emblem includes status information pertaining to the first entity, wherein the first entity is the second user; and generating an interface for presentation to individual users, wherein the interface is configured to receive inputs from users that affect presentation of one or more emblems, such that one or more received inputs from the first user affect the presentation of one or both of the first emblem and the second emblem and such that one or more received inputs from the second user affect the presentation of the first emblem.

* * * * *